United States Patent [19]
Arts et al.

[11] Patent Number: 6,078,147
[45] Date of Patent: Jun. 20, 2000

[54] DISCHARGE LAMP BALLAST CIRCUIT WITH DUTY CYCLE DIMMING CONTROL

[75] Inventors: Paulus P. B. Arts; Arnold W. Buij; Etienne N. K. P. M. Eberson, all of Eindhoven, Netherlands

[73] Assignee: U.S. Philips Corporation, New York, N.Y.

[21] Appl. No.: 09/022,127

[22] Filed: Feb. 11, 1998

[30] Foreign Application Priority Data

Feb. 13, 1997 [EP] European Pat. Off. .............. 97200404

[51] Int. Cl.[7] ....................................... G05F 1/00
[52] U.S. Cl. .................. 315/291; 315/307; 315/209 R; 315/DIG. 5; 315/DIG. 7; 315/244
[58] Field of Search .................................. 315/291, 307, 315/209 R, 244, DIG. 2, DIG. 5, DIG. 7; 362/265, 221; 313/318

[56] References Cited

U.S. PATENT DOCUMENTS

| | | |
|---|---|---|
| 4,358,716 | 11/1982 | Cordes et al. .......................... 315/306 |
| 4,373,146 | 2/1983 | Bonazoli et al. .................... 315/209 R |
| 4,677,345 | 6/1987 | Nilssen ................................ 315/209 R |
| 5,003,230 | 3/1991 | Wong et al. ............................. 315/279 |
| 5,365,151 | 11/1994 | Spiegel et al. ...................... 315/209 R |
| 5,410,221 | 4/1995 | Mattas et al. ............................ 315/307 |
| 5,414,327 | 5/1995 | Reijnaerts ............................... 315/219 |
| 5,528,117 | 6/1996 | Buij et al. ............................... 315/224 |
| 5,550,722 | 8/1996 | Bouwman et al. ...................... 362/221 |

*Primary Examiner*—Haissa Philogene
*Attorney, Agent, or Firm*—Bernard Franzblau

[57] ABSTRACT

A circuit for supplying a discharge lamp, comprising a converter for generating a high-frequency current at a frequency f from a supply voltage and a circuit portion I for adjusting the power consumed by the discharge lamp through adjustment of the frequency. The circuit portion I is provided with a circuit portion II for low-frequency square-wave modulation of the frequency f and for the adjustment of the duty cycle of the square-wave modulation. As a result, the discharge lamp can be dimmed over a very wide range without striations or moding occurring and without undesirable shifts in the color point of the light.

13 Claims, 2 Drawing Sheets

DISCHARGE LAMP BALLAST CIRCUIT WITH DUTY CYCLE DIMMING CONTROL

BACKGROUND OF THE INVENTION

This invention relates to a circuit arrangement for supplying a discharge lamp, comprising a converter for generating a high-frequency current at a frequency f from a supply voltage, and a circuit portion I for adjusting the power consumed by the discharge lamp through adjustment of the frequency.

The invention also relates to a compact fluorescent lamp and to a method of supplying a discharge lamp.

A circuit arrangement as mentioned in the opening paragraph is known from U.S. Pat. No. 5,003,230. In the known circuit arrangement, an inductive element is connected in series with the discharge lamp. If the frequency f is made higher, the impedance of the inductive element increases, so that the lamp current decreases. It is thus possible to dim the discharge lamp by means of the known circuit arrangement in that the frequency is adjusted by means of the circuit portion I. A disadvantage of supplying a discharge lamp with a high-frequency current is that, for example, in the case of a low-pressure mercury discharge lamp, striations may arise in the discharge lamp, especially if the discharge lamp operates in the dimmed state. A further disadvantage is that there is no unequivocal relation between the power consumed by the discharge lamp and the frequency f, especially for comparatively low luminous flux values and comparatively low ambient temperatures. As a result of this, the luminous flux of the discharge lamp will fluctuate in time, a phenomenon which is usually referred to as "moding". A problem which also arises in this dimming method is that the color point of the light radiated by the discharge lamp lies comparatively far removed from the blackbody line in the color triangle during dimming.

SUMMARY OF THE INVENTION

It is an object of the invention to provide a circuit arrangement with which it is possible to supply a discharge lamp and to adjust the luminous flux of the discharge lamp over a comparatively wide range without moding or striations occurring and without an undesirable shift in the color point of the light taking place.

According to the invention, a circuit arrangement of the kind mentioned in the opening paragraph is for this purpose characterized in that the circuit portion I is provided with a circuit portion II for low-frequency square-wave modulation of the frequency f and for adjusting the duty cycle of said square-wave modulation.

Owing to the square-wave modulation, a current of a first frequency f1 and a current of a second frequency f2 flow alternately through a discharge lamp which is supplied by means of the circuit arrangement according to the invention. The time interval during which the discharge lamp passes a current of the first frequency f1 in each cycle of the square-wave modulation is $\Delta t1$. The time interval during which the discharge lamp passes a current of the second frequency f2 in each cycle of the square-wave modulation is $\Delta t2$. The duty cycle of the square-wave modulation is understood to be the ratio $\Delta t1/(\Delta t1+\Delta t2)$. The frequency f2 is preferably chosen such that the discharge lamp consumes approximately a power which is equal to the rated power of the discharge lamp at this frequency. The frequency f1 is preferably chosen such that the power consumed by the discharge lamp has a very low value at this frequency, but without moding or striations. The luminous flux of the discharge lamp is comparatively low during $\Delta t1$ and the luminous flux of the lamp is comparatively high during $\Delta t2$. If the frequency of the square-wave modulation is chosen to be high enough, the transition from a comparatively high luminous flux to a comparatively low luminous flux and vice versa is not observable to the human eye, and the observed luminous flux is the time-averaged luminous flux over a cycle of the square-wave modulation. The time intervals $\Delta t1$ and $\Delta t2$ are adjusted during the adjustment of the duty cycle. The perceived, time-averaged luminous flux is adjusted thereby at the same time. It was found that striations and moding do not occur in this method of dimming. It was also found that the color point of the light radiated by the discharge lamp shows no undesirable shift during dimming of the discharge lamp, but remains comparatively close to the blackbody line while being shifted.

It should be noted that U.S. Pat. No. 5,365,151 describes a circuit arrangement for supplying a discharge lamp with a high-frequency current, in which the frequency is square-wave modulated. In the circuit arrangement described therein, however, the second frequency f2 is chosen such that the discharge lamp consumes a power higher than the rated power of the discharge lamp during the time interval $\Delta t2$. During the time interval $\Delta t1$, when the frequency is equal to the value f1, a comparatively low power is consumed by the discharge lamp. The value of the power consumed by the discharge lamp averaged over a cycle of the square-wave modulation is chosen to be approximately equal to the rated lamp power. A suitable choice of $\Delta t1$ and $\Delta t2$ and of the powers consumed by the discharge lamp during these time intervals renders it possible to adjust the color point and the luminous flux of the light radiated by the discharge lamp to desired values (when the rated lamp power is consumed). It is not possible in the circuit arrangement described in U.S. Pat. No. 5,365,151 to adjust the duty cycle of the square-wave modulation, and thus the luminous flux of the discharge lamp, so that the circuit arrangement described in U.S. Pat. No. 5,365,151 differs substantially from a circuit arrangement according to the invention.

Good results were obtained with a circuit arrangement according to the invention wherein the circuit arrangement comprises a bridge circuit.

The average power consumed by the discharge lamp will change, while the values of the frequency f and the duty cycle of the square-wave modulation remain the same, for example, in the case of ageing of the discharge lamp. To prevent the luminous flux of the discharge lamp from changing as a result of this, it is desirable to provide the circuit arrangement with a power control mechanism which controls the average power consumed by the discharge lamp at a substantially constant level. It is possible to control the average value of the power consumed by the discharge lamp by generating a signal which is a measure for this average value, by comparing this signal with a signal which is a measure for a desired average value of the power consumed by the discharge lamp, and by adjusting the duration of the first and/or second time interval in dependence on the outcome of this comparison. It is comparatively complicated, however, to generate a signal which is a measure of the average power consumed by the discharge lamp, so that such a power control is unattractive. A comparatively simple and reliable power control can be realized in that the circuit arrangement is provided with a power control for controlling the power consumed by the discharge lamp at a substantially constant level through adjustment of the frequency f. Since the power is controlled at a substantially constant value in this manner both during the time interval Δt1 and during the time interval Δt2, the time average of the power consumed by the discharge lamp is also constant. It was found that the stability of the discharge was further improved by this power control.

Since striations and moding occur especially in dimming of discharge lamps of the compact fluorescent type, the circuit arrangement is highly suitable for supplying and dimming such a discharge lamp. Preferably, the circuit arrangement is provided inside the housing of the compact fluorescent lamp.

A method according to the invention for supplying a discharge lamp with a high-frequency current with frequency f, whereby the power consumed by the discharge lamp is low-frequency modulated through low-frequency modulation of the frequency f, is characterized in that the power consumed by the discharge lamp is less than the rated power of the discharge lamp. Preferably, the low-frequency modulation is realized in that alternately and with low frequency the power consumed by the discharge lamp is adjusted to a first value P1 through adjustment of the frequency f during a first time interval and the power consumed by the discharge lamp is adjusted to a second value P2 through adjustment of the frequency f during a second time interval, with P1≦Pnom and P2≦Pnom, Pnom being the rated power of the discharge lamp.

BRIEF DESCRIPTION OF THE DRAWING

The invention will now be explained in more detail with reference to a drawing, in which.

DESCRIPTION OF THE PREFERRED EMBODIMENTS

Figure 1:
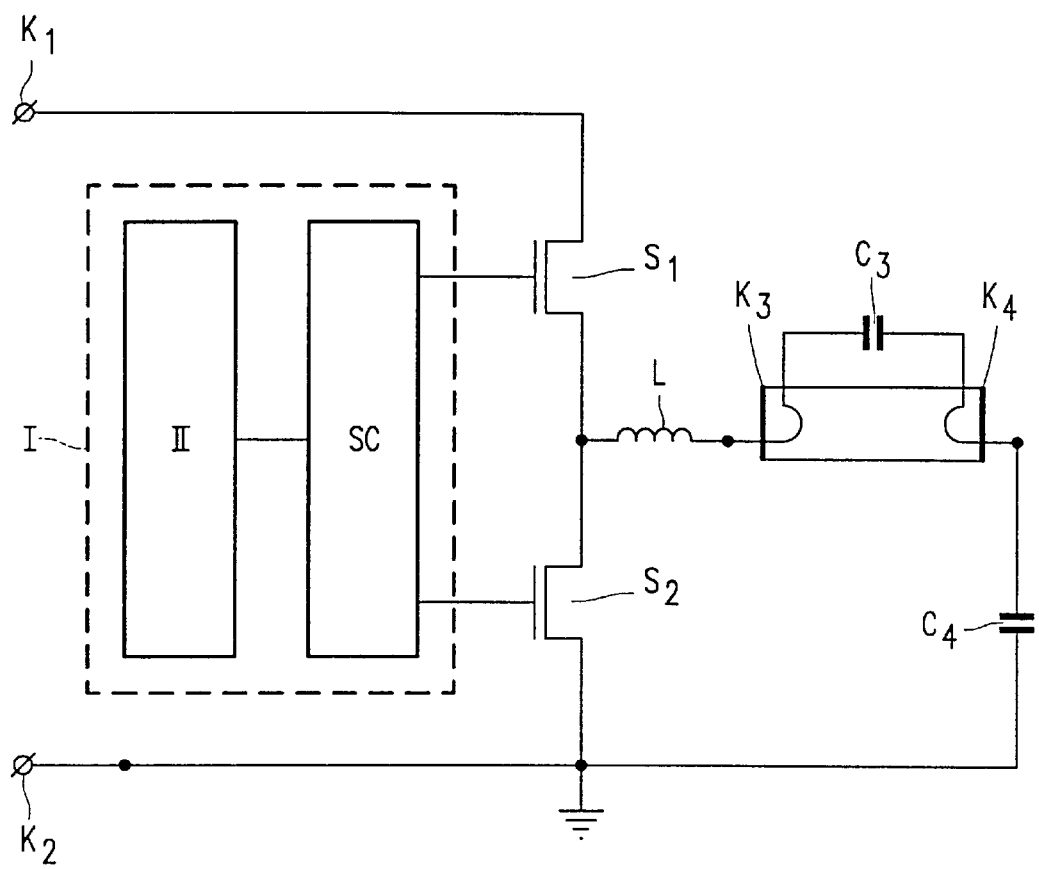
FIG. 1 is a circuit diagram of an embodiment of a circuit arrangement according to the invention.

In FIG. 1, K1 and K2 are terminals for connection to a supply voltage source. This supply voltage source is a DC voltage source in the embodiment shown in FIG. 1. Terminals K1 and K2 are interconnected by a series arrangement of two switching elements S1 and S2. SC is a circuit portion for generating a control signal for rendering the switching elements S1 and S2 alternately conducting at a frequency f. A first and a second output of circuit portion SC are for this purpose coupled to a control electrode of switching element S1 and a control electrode of switching element S2, respectively. II is a circuit portion for the low-frequency square-wave modulation of the frequency f and for the adjustment of the duty cycle of the square-wave modulation. An output of circuit portion II is for this purpose coupled to an input of circuit portion SC. The circuit portions II and SC in this embodiment together form a circuit portion I for adjusting the frequency f. Switching element S2 is shunted by a series arrangement of an inductive element L, terminals K3 and K4 for connecting a discharge lamp, and a capacitor C4. A discharge lamp La is connected to the terminals K3 and K4. The discharge lamp La is shunted by a capacitor C3.

The operation of the circuit arrangement shown in FIG. 1 is as follows.

When the terminals K1 and K2 are connected to a supply voltage source, the circuit portion SC will render the switching elements S1 and S2 alternately conducting at a frequency f. As a result, a high-frequency current with frequency f will flow through the discharge lamp. The frequency f is subjected to a low-frequency square-wave modulation by the circuit portion II. As a result, the frequency of the lamp current alternately has the comparatively high value f1 during a time interval Δt1 and the comparatively low value f2 during a time interval Δt2. Since the impedance of the inductive element L in series with the discharge lamp is comparatively high for comparatively high values of the frequency f of the lamp current, the discharge lamp La will consume a comparatively low power P1 during the time interval Δt1. The impedance of the inductive element L is comparatively low in the case of comparatively low values of the frequency f, so that the discharge lamp will consume a comparatively high power P2 during the time interval Δt2. The average power Pav consumed by the discharge lamp is theoretically:

$$Pav = \frac{\Delta t1 * P1 + \Delta t2 * P2}{\Delta t1 + \Delta t2}$$

This average power Pav consumed by the discharge lamp, and thus also the luminous flux of the discharge lamp, can be adjusted in that the ratio between Δt1 and Δt2, i.e. the duty cycle of the square-wave modulation, is adjusted.

Figure 2:
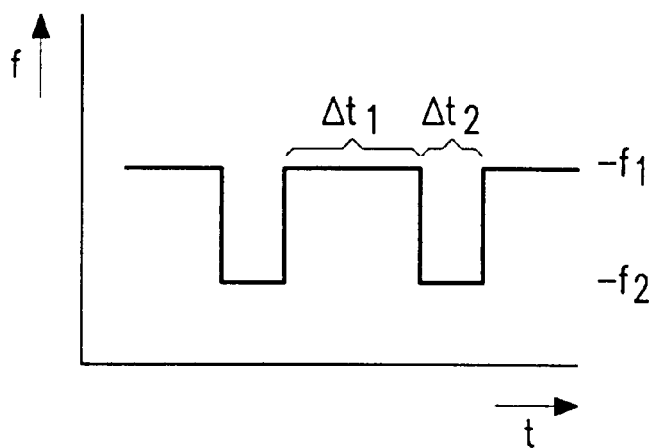
FIG. 2 plots the frequency of the lamp current of a discharge lamp supplied by means of a circuit arrangement as shown in FIG. 1 as a function of time.

In FIG. 2, time is plotted on the horizontal axis in arbitrary units and the frequency on the vertical axis in arbitrary units. The square-wave curve represents the frequency of the lamp current of a discharge lamp supplied by a circuit arrangement as shown in FIG. 1 as a function of time. It is apparent that the frequency f alternately has the value f1 during a time interval Δt1 and the value f2 during a time interval Δt2.

Figure 3:
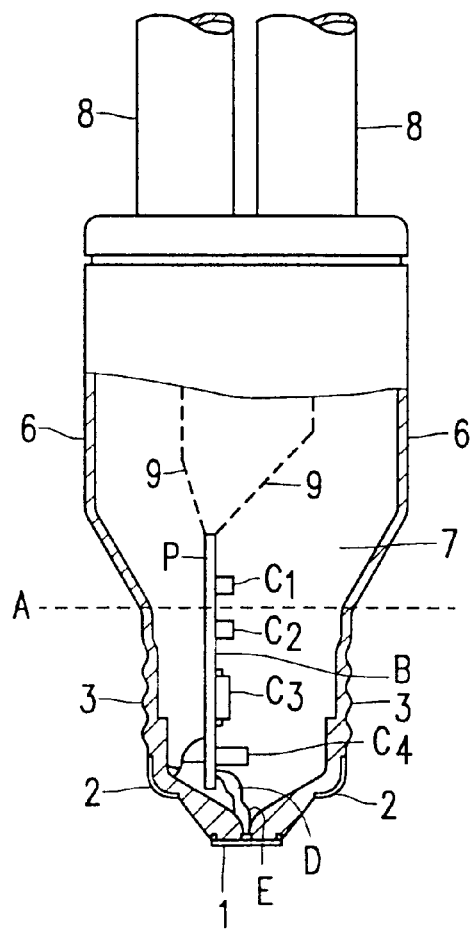
FIG. 3 shows part of a compact fluorescent lamp provided with a circuit arrangement according to the invention.

In FIG. 3, reference numeral 8 denotes part of a discharge vessel which is sealed in a gastight manner and which transmits radiation. A wall 6 of a housing is connected to the discharge vessel 8 and is provided with a lamp cap 3. A circuit arrangement B according to the invention is present in a space 7 surrounded by said housing. The circuit arrangement is diagrammatically represented in the form of components P and C1–C4. Connection wires 9 are present between the circuit arrangement and electrodes (not shown) in the discharge vessel. E denotes connection wires between the circuit arrangement and electrical contacts 1 and 2 arranged on the lamp cap. It is possible to adjust the duty cycle of the square-wave modulation of the frequency f of the lamp current by means which are not shown in FIG. 3 and which are arranged outside the housing.

In a practical embodiment of the circuit arrangement as shown in FIG. 1, f1 was chosen to be equal to 45 kHz and f2 to be equal to 25 kHz. A low-pressure mercury discharge lamp (make Philips) of the TLD type having a power rating of 58 watts was supplied by means of this circuit arrangement. During time interval Δt1, when the frequency of the lamp current was 45 kHz, the discharge lamp consumed a power of 0.2 watt. During time interval Δt2, when the frequency of the lamp current was 25 kHz, the discharge lamp consumed a power of 42 watts. It was found to be possible to adjust the average power consumed by the discharge lamp to any value between 0.2 watt and 42 watts by means of the circuit arrangement without striations and/or moding occurring and without undesirable shifts of the color point of the light taking place.

In another practical embodiment of the circuit arrangement shown in FIG. 1, f1 was chosen to be equal to 90 kHz and f2 to be equal to 45 kHz in a corresponding manner. A compact fluorescent lamp (make Philips) of the PLET type having a power rating of approximately 15 watts was supplied by means of this circuit arrangement. It was found to be possible to adjust the power consumed by the compact fluorescent lamp over a range from approximately 1 watt up to approximately 14 watts by means of this circuit arrangement without striations and/or moding occurring and without undesirable shifts in the color point of the light.

We claim:

1. A circuit arrangement for supplying a discharge lamp, comprising:
   a converter for generating a high-frequency current at a frequency f from a supply voltage,
   a circuit portion I for adjusting the power consumed by the discharge lamp through adjustment of the frequency, characterized in that the circuit portion I includes a circuit portion II for low-frequency square-wave modulation of the frequency f and for adjusting the duty cycle of said square-wave modulation.

2. A circuit arrangement as claimed in claim 1, wherein the circuit arrangement comprises a bridge circuit including first and second series connected semiconductor controlled switching elements.

3. A circuit arrangement as claimed in claim 1, wherein the circuit arrangement includes a power control for controlling the power consumed by the discharge lamp at a substantially constant level through adjustment of the frequency f.

4. A compact fluorescent lamp comprising: a discharge lamp which is sealed in a gastight manner and which transmits radiation, a housing connected to the discharge lamp and provided with a lamp cap, wherein a circuit arrangement as claimed in claim 1 is present within the housing.

5. A method of supplying a discharge lamp with a high-frequency current at a frequency f, which comprises the step of: low frequency modulating the power consumed by the discharge lamp by low-frequency modulation of the frequency f, characterized in that the power consumed by the discharge lamp is less than the rated power of the discharge lamp.

6. A method as claimed in claim 5, which comprises the steps of: adjusting alternately at a low frequency the power consumed by the discharge lamp to a first value P1 by adjusting the frequency f during a first time interval and adjusting the power consumed by the discharge lamp to a second value P2 by adjusting the frequency f during a second time interval, with $P1 \leq P_{nom}$ and $P2 \leq P_{nom}$, $P_{nom}$ being the rated power of the discharge lamp.

7. A method as claimed in claim 5 which further comprises the step of:
   adjusting the duty cycle of said low frequency modulation thereby to dim said discharge lamp over a very wide dimming range and without striations or moding occurring in the discharge lamp.

8. A circuit for operating a discharge lamp comprising:
   first and second input terminals for connection to a source of supply voltage for the circuit,
   a converter including first and second series connected semiconductor switching devices coupled to said input terminals for generating a high frequency current for operation of the discharge lamp,
   a pair of lamp connection terminals,
   an inductor connected in series circuit with said pair of lamp connection terminals across the second semiconductor switching device,
   a control circuit coupled to respective control electrodes of the first and second semiconductor switching devices to alternately drive the semiconductor switching devices on and off so as to adjust the power of a discharge lamp, when connected to the lamp connection terminals, by adjustment of the frequency of said high frequency current, and wherein said control circuit includes means for the low frequency square-wave modulation of the frequency of the high frequency current between at least first and second frequencies $f_1$ and $f_2$, and means for adjusting the duty cycle of said low frequency square-wave modulation thereby to dim a connected discharge lamp over a wide power range and without the occurrence of striations in the connected discharge lamp.

9. The discharge lamp operating circuit as claimed in claim 8 wherein the lamp connection terminals are arranged so that only a single discharge lamp can be operated by the lamp operating circuit.

10. The discharge lamp operating circuit as claimed in claim 8 wherein said control circuit operates independently of the power consumed by a connected discharge lamp.

11. The discharge lamp operating circuit as claimed in claim 8 wherein the control circuit produces a step-wise frequency modulation between the first and second frequencies $f_1$ and $f_2$, wherein at the frequency $f_2$ a connected discharge lamp consumes a power approximately equal to the rated lamp power and at the frequency $f_1$ the connected lamp consumes a relatively low power.

12. The discharge lamp operating circuit as claimed in claim 8 wherein said discharge lamp is a compact fluorescent lamp connected to said lamp connection terminals and having a housing containing the discharge lamp operating circuit.

13. The discharge lamp operating circuit as claimed in claim 8 further comprising a capacitor connected in series with said inductor and said lamp connection terminals.

* * * * *